US012619858B2

(12) United States Patent
Sakamoto et al.

(10) Patent No.: US 12,619,858 B2
(45) Date of Patent: May 5, 2026

(54) PROCESSING SYSTEM, PROCESSING METHOD, AND PROCESSING PROGRAM

(71) Applicant: NTT, Inc.

(72) Inventors: Akira Sakamoto, Tokyo (JP); Ichiro Morinaga, Tokyo (JP); Kyoku Shi, Tokyo (JP); Shohei Enomoto, Tokyo (JP); Takeharu Eda, Tokyo (JP)

(73) Assignee: NTT, Inc., Tokyo (JP)

( * ) Notice: Subject to any disclaimer, the term of this patent is extended or adjusted under 35 U.S.C. 154(b) by 565 days.

(21) Appl. No.: 18/037,972

(22) PCT Filed: Nov. 24, 2020

(86) PCT No.: PCT/JP2020/043564
§ 371 (c)(1),
(2) Date: May 19, 2023

(87) PCT Pub. No.: WO2022/113152
PCT Pub. Date: Jun. 2, 2022

(65) Prior Publication Data
US 2023/0409884 A1     Dec. 21, 2023

(51) Int. Cl.
G06K 9/62          (2022.01)
G06K 9/36          (2006.01)
G06N 3/0464        (2023.01)
(52) U.S. Cl.
CPC ................................. G06N 3/0464 (2023.01)
(58) Field of Classification Search
CPC ...... G06N 3/0464; G06N 3/09; G06N 3/0455; G06F 18/285; G06V 10/26; G06V 10/764; G06V 10/774; G06V 10/82
See application file for complete search history.

(56) References Cited

U.S. PATENT DOCUMENTS

| 2016/0307074 A1 * | 10/2016 | Shen ..................... G06V 10/454 |
| 2020/0342258 A1 * | 10/2020 | Uno ......................... G06N 3/08 |
| 2021/0117717 A1 * | 4/2021 | Ha ......................... G06V 10/764 |
| 2021/0173707 A1 | 6/2021 | Kou et al. |
| 2021/0374618 A1 * | 12/2021 | Miyazaki ............. G06V 10/764 |

FOREIGN PATENT DOCUMENTS

| JP | 2001005967 A | 1/2001 |
| WO | 2020000383 A1 | 1/2020 |

OTHER PUBLICATIONS

Okoshi et al. (2018) "Proposal and Evaluation of DNN Model Operation Method with Cloud/Edge Collaboration" Proceedings of the 80th National Convention, 2018(1), 3-4.

* cited by examiner

*Primary Examiner* — Maroun P Kanaan

(57) ABSTRACT

A processing system is performed by using an edge device and a server device, wherein the edge device includes first processing circuitry configured to input divided data obtained by dividing processing data into a plurality of pieces to a corresponding first model among a plurality of first models, and cause inference in each of the first models to be executed, and output, to the server device, only the divided data for which it is determined that an inference result in the corresponding first model matches a predetermined condition among a plurality of pieces of the divided data, and the server device includes second processing circuitry configured to execute inference processing on the divided data output from the edge device by using a second model having a higher amount of computation than that of the first model.

11 Claims, 9 Drawing Sheets

Fig. 1

PROCESSING SYSTEM, PROCESSING METHOD, AND PROCESSING PROGRAM

CROSS-REFERENCE TO RELATED APPLICATIONS

This application is a U.S. National Stage Application filed under 35 U.S.C. § 371 claiming priority to International Patent Application No. PCT/JP2020/043564, filed on 24 Nov. 2020, the disclosure of which is hereby incorporated herein by reference in its entirety.

TECHNICAL FIELD

The present invention relates to a processing system, a processing method, and a processing program.

BACKGROUND ART

Since a data volume of data collected by an IoT device represented by a sensor is enormous, an enormous communication amount is generated when data collected by cloud computing is aggregated and processed. For this reason, even in an edge device close to a user, attention is focused on edge computing that processes collected data.

However, an amount of computation and resources such as a memory of a device used in the edge device are poor as compared with a device other than the edge device, the device being physically and logically disposed farther from the user than the edge device (hereinafter, the device is described as a cloud for convenience). For this reason, when processing with a large computation load is performed by the edge device, it may take a lot of time to complete the processing, or it may also take time to complete other processing with a small amount of computation.

Here, one of types of processing with a large amount of computation is processing related to machine learning. Non Patent Literature 1 proposes application of so-called adaptive learning to the edge cloud. That is, in a method described in Non Patent Literature 1, a learned model learned by using general-purpose learning data in a cloud is developed in an edge device, and learning is performed again on the model learned by the cloud by using data acquired by the edge device, whereby operation utilizing advantages of the cloud and the edge device is implemented.

CITATION LIST

Non Patent Literature

Non Patent Literature 1: Okoshi et al., "Proposal and Evaluation of DNN Model Operation Method with Cloud/Edge Collaboration", Proceedings of the 80th National Convention, 2018(1), 3-4, 2018 Mar. 13.

SUMMARY OF INVENTION

Technical Problem

However, in a case where data size of processing data is large, such as a high-accuracy (high-definition (4K, 8K)) camera image, if all the processing data that cannot be determined on an edge side is transmitted to a cloud side, there has been a problem that a transmission path is pressed, and also on the server side, processing time for the processing data having a large data size becomes long.

The present invention has been made in view of the above, and an object thereof is to provide a processing system, a processing method, and a processing program capable of reducing an amount of data transfer from an edge device to a server device and reducing a computation load in the server device.

Solution to Problem

To solve the above-described problem and achieve the object, a processing system according to the present invention is a processing system performed by using an edge device and a server device, in which the edge device includes: first processing circuitry configured to: input divided data obtained by dividing processing data into a plurality of pieces to a corresponding first model among a plurality of first models, and cause inference in each of the first models to be executed; and output, to the server device, only the divided data for which it is determined that an inference result in the corresponding first model matches a predetermined condition among a plurality of pieces of the divided data, and the server device includes second processing circuitry configured to: execute inference processing on the divided data output from the edge device by using a second model having a higher amount of computation than that of the first model.

Advantageous Effects of Invention

According to the present invention, it is possible to reduce the amount of data transfer from the edge device to the server device and to reduce the computation load in the server device.

BRIEF DESCRIPTION OF DRAWINGS

FIG. 1 is a diagram illustrating an outline of a processing method of a processing system according to an embodiment.

DESCRIPTION OF EMBODIMENTS

Figure 2:
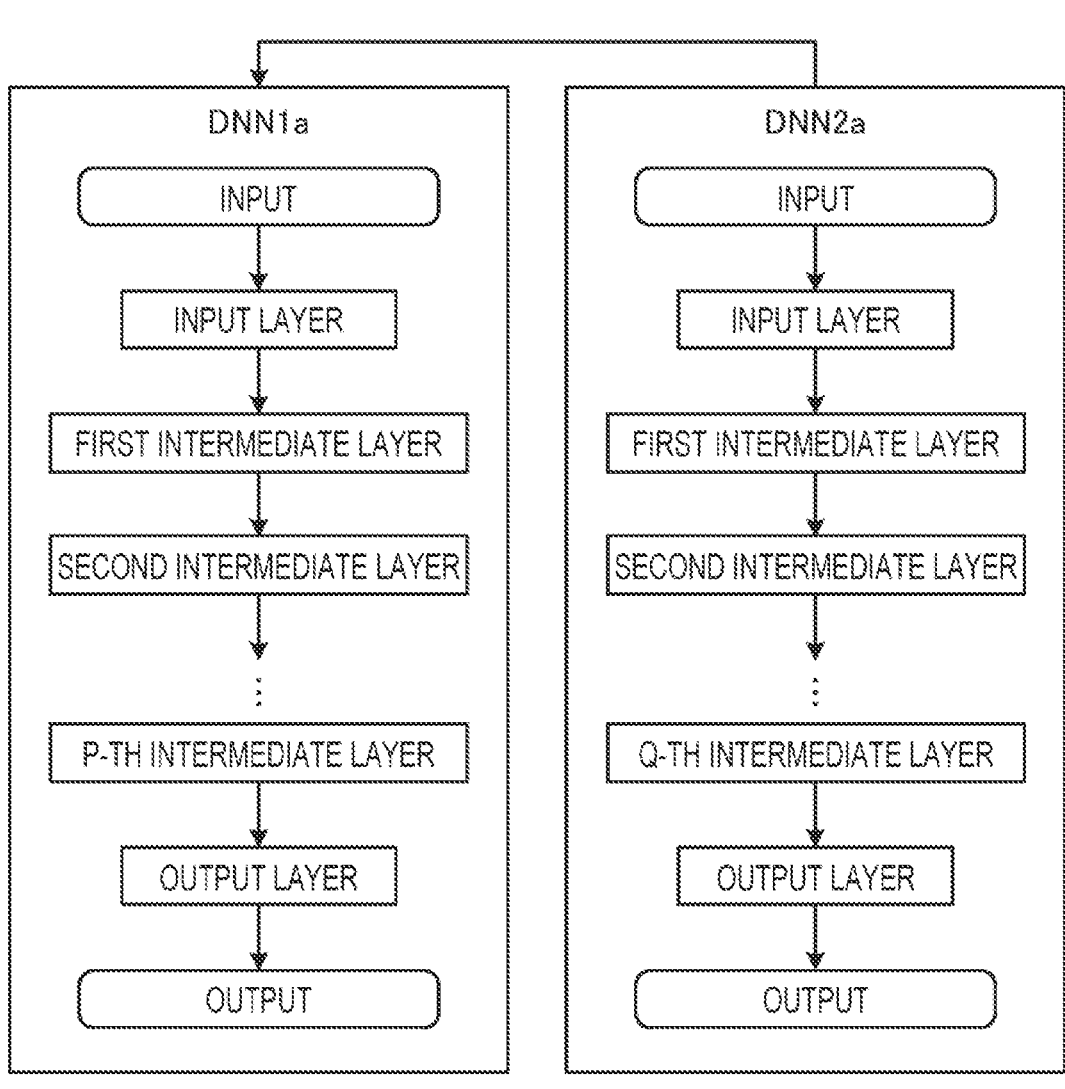
FIG. 2 is a diagram illustrating an example of a DNN1 and a DNN2.

Hereinafter, an embodiment of the present invention will be described in detail with reference to the drawings. Note that the present invention is not limited by this embodiment. In addition, the same portions are denoted by the same reference signs in the description of the drawings.

[Embodiment]

[Outline of Embodiment] An embodiment of the present invention will be described. In the embodiment of the present invention, a processing system will be described that performs inference processing using a learned high-accuracy model and a learned lightweight model. Note that, in the processing system of the embodiment, a case will be described where a deep neural network (DNN) is used as a model used in the inference processing, as an example. In the processing system of the embodiment, a neural network other than the DNN may be used, and signal processing with a low amount of computation and signal processing with a high amount of computation may be used instead of the learned models.

Figure 1:
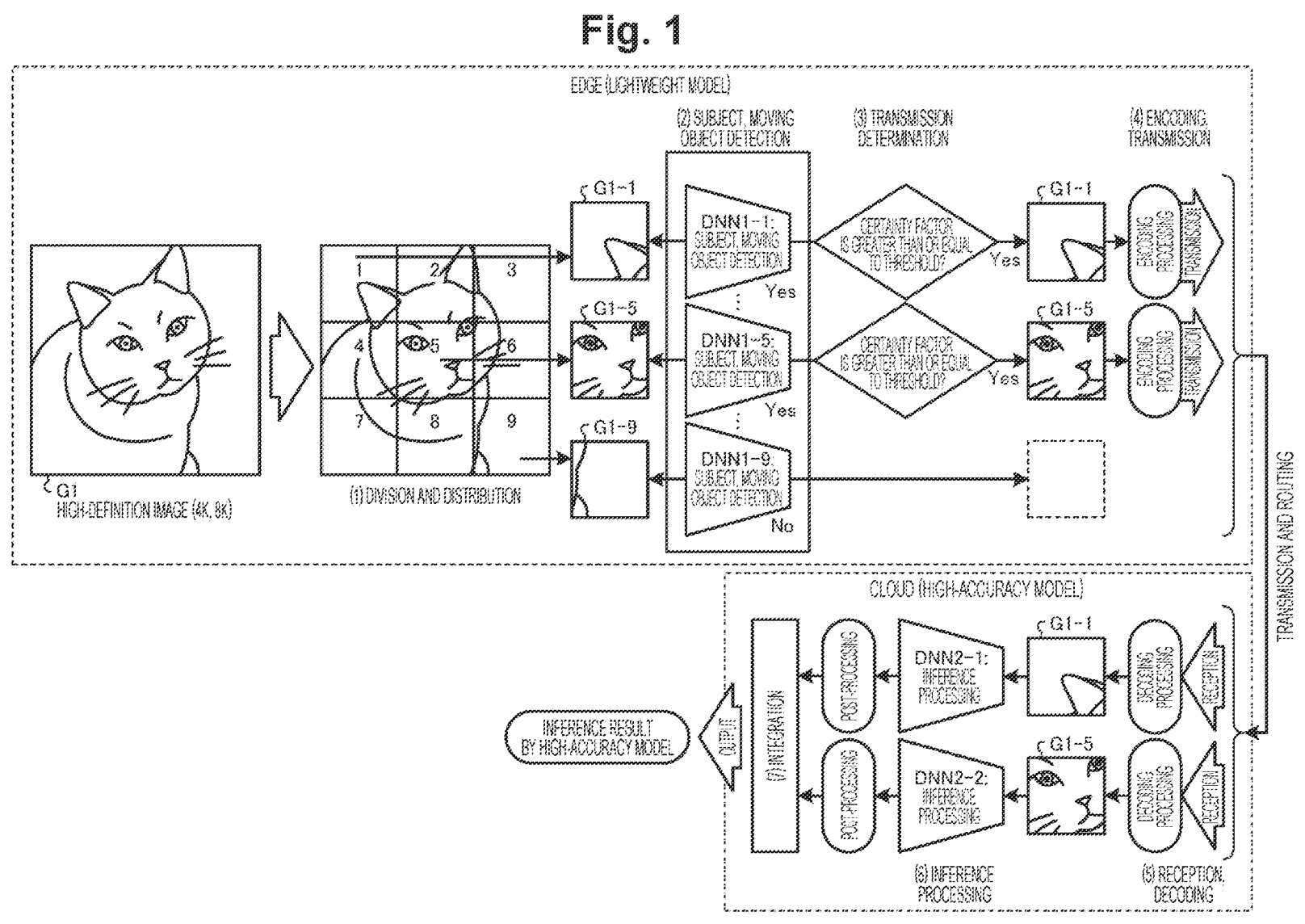

FIG. 1 is a diagram illustrating an outline of a processing method of the processing system according to the embodiment. The processing system of the embodiment configures a model cascade using the high-accuracy model and the lightweight model. In the processing system of the embodiment, it is controlled whether the processing is executed in an edge device using a high-speed and low-accuracy lightweight model (for example, a DNN1 (first model)) or a cloud (server device) using a low-speed and highly accurate high-accuracy model (for example, a DNN2 (second model)). For example, the server device is a device disposed at a place physically and logically far from a user. The edge device includes an IoT device and various terminal devices disposed at places physically and logically close to the user, and has fewer resources than those of the server device.

The DNN1 and the DNN2 are models that output inference results on the basis of input processing target data. In the present embodiment, for example, to enable high-speed processing even for a high-accuracy camera image having a large data size, the edge device divides an input image, executes a plurality of pieces of processing in parallel for respective divided images, and transmits only a divided image satisfying a predetermined condition to the cloud side. The edge device and the server device include a plurality of the DNN1s and DNN2s, and execute pieces of processing including inference processing in parallel. In addition, an effect is also exerted on high-frame-rate video. Only an image determined by the edge device that a desired subject is imaged or an image having a change (movement) compared to a preceding or subsequent image may be transmitted to the cloud side. Furthermore, the image may be divided, and divided images of an image including a desired subject may be transmitted to the cloud side.

In the example of FIG. 1, in a case where a high-definition (4K, 8K) image (Hereinafter, it is referred to as an image G1) is input as processing data to the edge device, the edge device divides the image G1 into, for example, nine equal parts, and distributes divided images G1-1 to G1-9 to a DNN1-1 to a DNN1-9, respectively ((1) of FIG. 1). The DNN1-1 to the DNN1-9 respectively perform, on the input divided images G1-1 to G1-9, subject recognition that infers a probability for each class of an object appearing in the image, and moving object detection ((2) of FIG. 1). Note that the number of the DNN1-1 to the DNN1-9 in the edge device is an example, and it is sufficient that a number of the DNN1s are provided corresponding to the number of divisions of the image. In addition, divided images may be processed in order by using the DNN1-1 to the DNN1-M (M is a number smaller than the number of divisions).

Then, on the basis of inference results by the DNN1-1 to the DNN1-9, the edge device selects the divided images G1-1 and G1-5 that include a predetermined subject (for example, a cat or a portion of a cat) and in which the moving object detection is made, and acquires certainty factors of the divided images G1-1 and G1-5. The certainty factors are degrees of certainty that results of the subject recognition by the DNN1-1 to the DNN1-9 are correct.

Subsequently, the edge device determines that the divided images G1-1 and G1-5 of which the certainty factors are greater than or equal to a predetermined threshold are transmission targets ((3) of FIG. 1), performs encoding processing on the divided images G1-1 and G1-5 for each of the divided images G1-1 and G1-5, and transmits the divided images G1-1 and G1-5 to the cloud (server device) ((4) of FIG. 1). At this time, a design may be made to send areas around the divided images. This is effective for improving inference accuracy in a case where the desired subject exists beyond the divided images. In particular, this is a case where the desired subject is imaged to occupy substantially the same area on a plurality of divided screens. The plurality of divided screens is effective, for example, in the case of two divided screens or in the case of a plurality of surrounding divided screens.

On the cloud side, when the divided images G1-1 and G1-5 output from the edge device are received, the divided images G1-1 and G1-5 are each decoded ((5) of FIG. 1), and are input to a 2-1 to a DNN2-9 ((6) of FIG. 1). The 2-1 to the DNN2-9 perform the inference processing of inferring a probability for each class of the object appearing in the image on the input divided images G1-1 and G1-5 ((6) of FIG. 1). Then, on the cloud side, after predetermined post-processing is performed, inference results by the 2-1 to the DNN2-9 are integrated ((7) of FIG. 1) and output as a processing result of the image G1 that is processing data. The number of the 2-1 to the DNN2-9 on the cloud side is an example, and it is sufficient that a number of the DNN2s are provided corresponding to the number of input divided images.

As described above, in the processing system according to the embodiment, the edge device divides the image to be processed, executes pieces of processing including the inference processing in parallel for the respective divided images, and transmits only the divided image satisfying the predetermined condition to the cloud side. Thus, in the present embodiment, it is possible to reduce the amount of data transfer from the edge device to the server device as compared with the case of transmitting the entire image to be processed. In addition, the server device performs the inference processing only for the transmitted divided image. For this reason, in the processing system according to the embodiment, it is possible to reduce a computation load in the server device as compared with the case of performing the inference processing on the entire image to be processed.

[Lightweight Model and High-Accuracy Model] Next, the DNN1 and the DNN2 will be described. FIG. 2 is a diagram illustrating an example of the DNN1 and the DNN2. The DNN includes an input layer into which data is input, a plurality of intermediate layers that variously converts the data input from the input layer, and an output layer that outputs a so-called inferred result such as probability or likelihood. In addition, the above-described certainty factor may be output. An output value of the intermediate layer as an output value to be sent to the cloud may be irreversible in a case where the input data needs to maintain anonymity.

As illustrated in FIG. 2, the processing system may use a DNN1a and a DNN2a independent of each other as the DNN1-1 to the DNN1-9 and the DNN2-1 to the DNN2-9. For example, after the DNN2a is trained in a known manner, the DNN1a may be trained by using learning data used in training of the DNN2a. Note that the number of the DNN1- . . . , and the number of the DNN2- . . . are not limited as long as they each are one or more.

Note that the same tasks having a difference in accuracy and performance may be assigned to the DNN1a and the DNN2a, or different tasks respectively including a model with a low amount of computation and a model with a high amount of computation may be assigned instead of the lightweight model and the high-accuracy model. For example, detection of a moving object may be performed as a model with a low amount of computation, and subject recognition may be performed as a model with a high amount of computation. In addition, the DNN1-1 to the DNN1-9 may learn for respective divided areas, or may be common DNNs. Furthermore, the DNN1-1 to the DNN1-9 may perform moving object detection together with subject recognition.

Figure 3:
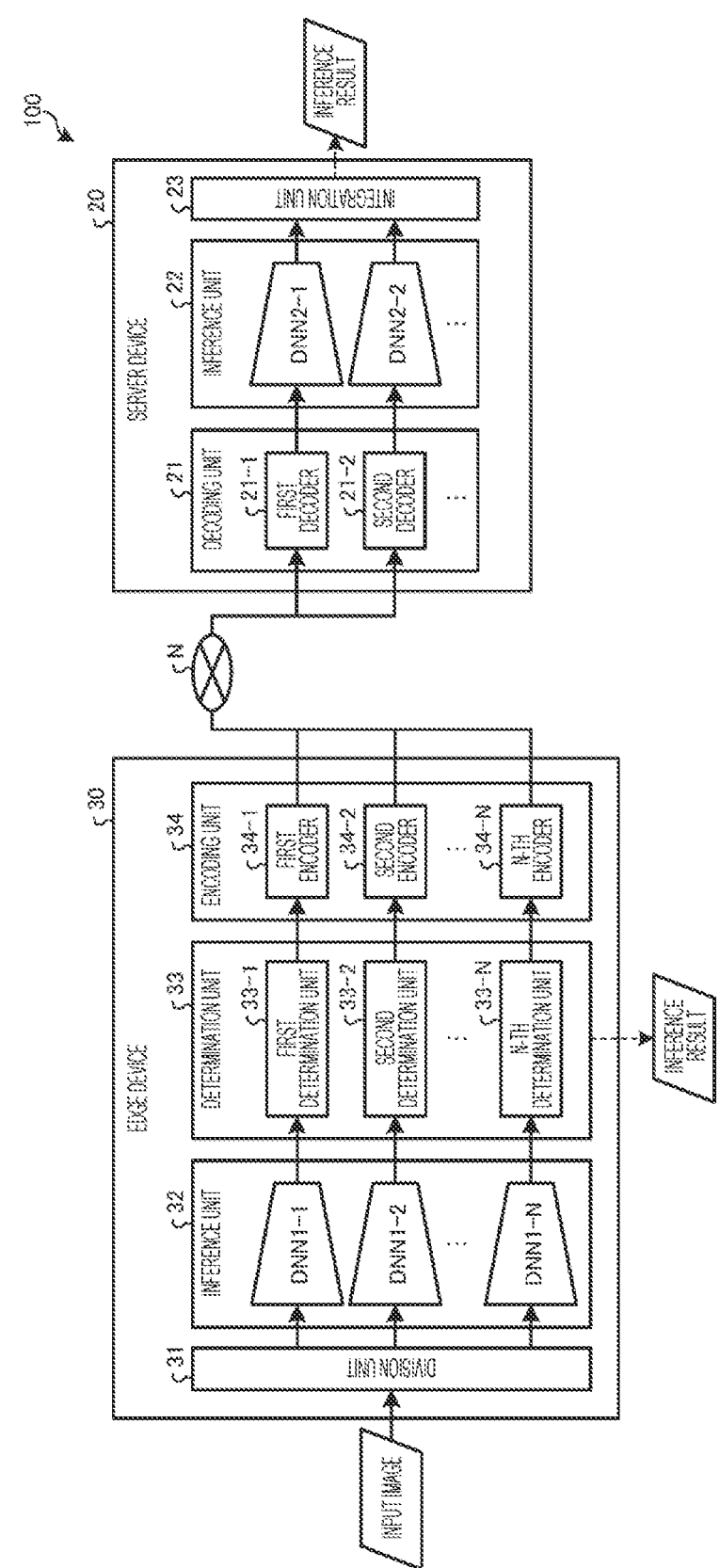
FIG. 3 is a diagram schematically illustrating an example of a configuration of the processing system according to the embodiment.

[Processing System] Next, a configuration of the processing system will be described. FIG. 3 is a diagram schematically illustrating an example of the configuration of the processing system according to the embodiment.

A processing system 100 according to the embodiment includes a server device 20 and an edge device 30. In addition, the server device 20 and the edge device 30 are connected to each other via a network N. The network N is, for example, the Internet. For example, the server device 20 is a server provided in a cloud environment. Furthermore, the edge device 30 is, for example, an IoT device and a variety of terminal devices.

Each of the server device 20 and the edge device 30 is implemented by, for example, a predetermined program being read by a computer or the like including a read only memory (ROM), a random access memory (RAM), a central processing unit (CPU), and the like, and the CPU executing the predetermined program. In addition, so-called accelerators are also used represented by a GPU, a vision processing unit (VPU), a field programmable gate array (FPGA), an application specific integrated circuit (ASIC), and a dedicated artificial intelligence (AI) chip. Each of the server device 20 and the edge device 30 includes a network interface card (NIC) or the like, and can perform communication with another device via a telecommunication line such as a local area network (LAN) or the Internet.

As illustrated in FIG. 3, the server device 20 includes: a decoding unit 21 including a plurality of decoders; an inference unit 22 (second inference unit) that performs inference using the plurality of DNN2s, the DNN2-1 to the DNN2-9 that are learned high-accuracy models; and an integration unit 23. The DNN2-1 to the DNN2-9 include information such as model parameters. Note that the number of the DNN 2-1 to the DNN2-9 is an example, and it is sufficient that a number of the DNN2s are provided corresponding to the number of input divided images.

The decoding unit 21 includes a first decoder 21-1 and a second decoder 21-2. The first decoder 21-1 and the second decoder 21-2 receive the divided images transmitted from the edge device 30 and perform decoding processing. Note that the number of the first decoders 21-1 and the second decoders 21-2 in the decoding unit 21 is an example, and the number of the decoders 21 included in the inference unit 22 is one in the case of the minimum configuration. Here, the minimum configuration of the entire system will also be described. In the minimum configuration, the numbers of the DNN1s, encoders, decoders, and DNN2s are all one. In addition, the number of any of the components may be variable. For example, the number of the DNN1s may be designed to be two, the number of encoders may be designed to be four, and others may be designed to be one in an asymmetric manner.

The inference unit 22 uses the DNN2 to execute inference processing on the divided images output from the edge device 30. The inference unit 22 uses the divided images output from the edge device 30 as inputs of the DNN2-1 to the DNN2-9. The inference unit 22 acquires an inference result (for example, a probability for each class of an object appearing in the image and the presence or absence of a moving object compared with preceding and subsequent images) as an output of each of the DNN2-1 to the DNN2-9. The inference unit 22 receives an input of inference data and outputs an inference result. It is assumed that the divided images each are data whose label is unknown. In addition, in a case where the inference result is returned to the user, the inference result obtained by the inference unit 22 may be transmitted to the edge device 30 and returned from the edge device 30 to the user. In the case of the minimum configuration, the number of the DNN2s included in the inference unit 22 is one.

The integration unit 23 integrates inference results for the respective divided images by the inference unit 22, and outputs an integrated inference result as a processing result of an image that is processing data.

Here, the server device 20 and the edge device 30 constitute a model cascade. Note that the model cascade is intended to use two or more independent models connected together in layers (two or more layers). For this reason, the inference unit 22 does not always perform inference. The inference unit 22 receives an input of a divided image determined to cause the server device 20 to execute the inference processing in the edge device 30, and performs inference by the DNN2.

The edge device 30 includes a division unit 31, an inference unit 32 (first inference unit) including the DNN1-1 to the DNN1-N(N is a natural number) that are learned lightweight models, a determination unit 33, and an encoding unit 34.

The division unit 31 divides the processing data. The division unit 31 divides the image to be processed. The size and the number of divisions of a divided portion are set depending on the resources of the edge device 30 and the server device 20, and transmission capability of a transmission path between the edge device 30 and the server device 20.

The inference unit 32 performs inference by using the plurality of DNN1s, the DNN1-1 to the DNN1-N that are learned lightweight models. The inference unit 32 inputs pieces of divided data divided by the division unit 31 to the corresponding DNNs among the plurality of DNNs, the DNN1-1 to the DNN1-N, and causes inference in each of the DNN1-1 to the DNN1-N to be executed. Note that the number of the DNN1s in the edge device 30 is an example, and the divided images may be processed in order by using the DNN1s of the number smaller than the number of divisions.

The DNN1-1 to the DNN1-N each perform subject recognition for inferring a probability for each class of an object appearing in the image. Furthermore, the DNN1-1 to the DNN1-N may perform moving object detection together with the subject recognition. In addition, in the DNN1-1 to the DNN1-N, only the moving object detection may be performed.

In addition, the inference unit 32 may use a further reduced weight model to perform moving object detection. For example, as a reduced weight model, there is a model that performs moving object detection by using encoded data included in data obtained by encoding an image. Specifically, there are a model in which the presence or absence of the moving object detection is determined depending on a ratio between an intra coded block and an inter coded block in divided areas, and a model in which the moving object detection is performed on the basis of a ratio of the amount of code to the other area. In addition, there are a model that determines the presence or absence of a change between corresponding areas in two images obtained by imaging substantially the same positions in the real space on the basis of an amount of code between these areas, and a model that acquires the presence or absence of a movement of a subject on the basis of a motion vector between two still images.

The inference unit 32 inputs divided images divided by the division unit 31 to the corresponding DNN1-1 to DNN1-N among the DNN1-1 to the DNN1-N, respectively, and causes subject recognition in each of the DNN1-1 to the DNN1-N to be executed. Furthermore, the inference unit 32 may cause the DNN1-1 to the DNN1-N to execute the moving object detection. The inference unit 32 outputs an inference result (for example, a subject recognition result, or the subject recognition result and the moving object detection) for a plurality of images.

The determination unit 33 outputs, to the server device 20, only the divided data for which it is determined that the inference result in a corresponding one of the DNN1-1 to the DNN1-N matches a predetermined condition, among the plurality of pieces of divided data. The determination unit 33 includes a first determination unit 33-1 to an N-th determination unit 33-N, each of which determines to output, to the server device 20, a divided image determined in a corresponding one of the DNN1-1 to the DNN1-N that at least a predetermined subject is included, among the plurality of divided images, and to cause the server device 20 to execute processing (inference processing) related to the inference data. The number of the first determination unit 33-1 to the N-th determination unit 33-N is an example, and only needs to be the same as the number of the DNN1-1 to the DNN1-N included in the inference unit 32 so that parallel processing can be executed on the divided images.

Then, each of the first determination unit 33-1 to the N-th determination unit 33-N may select a divided image including the predetermined subject and having a certainty factor for a result of subject recognition for the divided image greater than or equal to a predetermined threshold, and output the divided image to the server device 20. The certainty factor is a degree of certainty that a result of subject recognition by each of the DNN1-1 to the DNN1-N is correct. For example, the certainty factor may be a probability for each class of an object appearing in each of the divided images respectively output by the DNN1-1 to the DNN1-N.

In addition, each of the first determination unit 33-1 to the N-th determination unit 33-N may select a divided image that includes the predetermined subject and in which moving object detection is made, and output the selected divided image to the server device 20. Alternatively, each of the first determination unit 33-1 to the N-th determination unit 33-N selects a divided image that includes the predetermined subject and in which the moving object detection is made and in which the certainty factor for the result of subject recognition for the divided image is greater than or equal to the predetermined threshold, and outputs the selected divided image to the server device 20. Note that, in a case where there is no divided image including the predetermined subject, the determination unit 33 outputs the inference result inferred by the inference unit 32.

The encoding unit 34 includes a first encoder 34-1 to an N-th encoder, respectively quantizes the divided images determined to be output to the server device 20 by the first determination unit 33-1 to the N-th determination unit 33-N, and then performs encoding processing of performing encoding processing for communication, and outputs the encoded images to the server device 20. The number of the first encoder 34-1 to the N-th encoder is an example, and may be the same as the number of the DNN1-1 to the DNN1-N included in the inference unit 32 so that parallel processing can be executed on the divided images, or the divided images may be processed in order by using encoders of the number smaller than the number of divisions.

Figure 4:
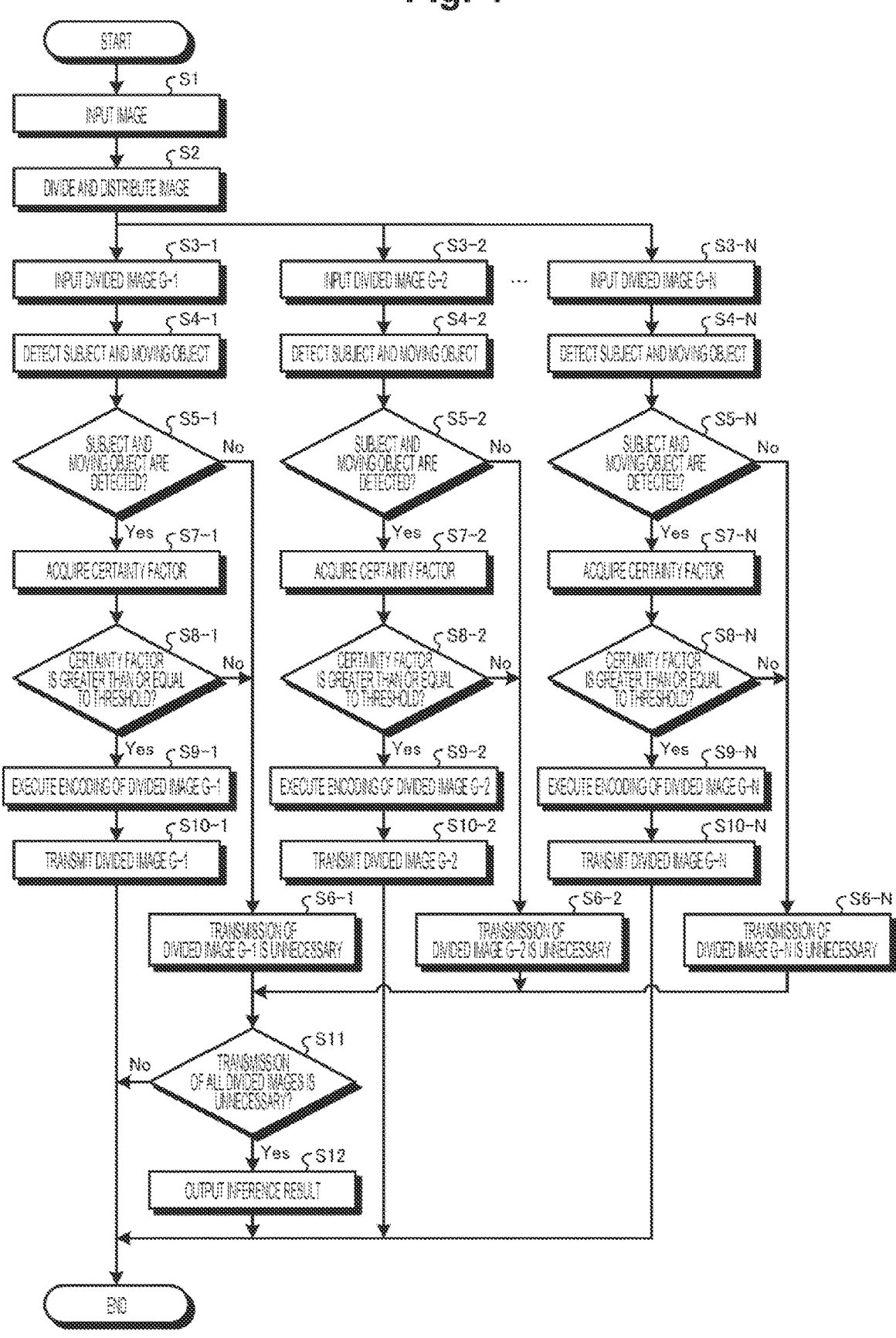
FIG. 4 is a flowchart illustrating a flow of processing executed by an edge device illustrated in FIG. 3.

Here, the encoding unit 34 may encode each divided image determined to be transmitted to the server device 20, or may combine the divided images and encode the combined divided images as one image. In a case where the resolution is the same as that of the original image, it is sufficient that the encoding unit 34 converts the divided image determined not to be transmitted to the server device 20 into a black single color or the like. At this time, the encoding unit 34 may encode the divided images determined to be transmitted to the server device 20 as one image by rearranging the divided images at positions different from the arrangement of the original image to increase the encoding efficiency. Specifically, the encoding unit 34 changes the arrangement so that the divided images determined to be transmitted to the server device 20 are adjacent to each other. [Processing in Edge Device] FIG. 4 is a flowchart illustrating a flow of processing executed by the edge device 30 illustrated in FIG. 3. As illustrated in FIG. 4, first, in the edge device 30, when an input of an image to be processed (for example, an image G) is received (step S1), the division unit 31 divides the image to be processed into divided images G-1 to G-N, and distributes the divided images to the DNN1-1 to the DNN1-N (step S2).

In the inference unit 32, the distributed divided images G-1 to G-N are input to the DNN1-1 to the DNN1-N, respectively (steps S3-1 to S3-N), and subject recognition, or the subject recognition and moving object detection are caused to be executed (steps S4-1 to S4-N).

The first determination unit 33-1 to the N-th determination unit 33-N determine whether or not the respective divided images G-1 to G-N include a predetermined subject, or include the predetermined subject and the moving object detection is made (steps S5-1 to S5-N).

In a case where it is determined that the predetermined subject is included, or the predetermined subject is included and the moving object detection is made (steps S5-1 to S5-N: Yes), the first determination unit 33-1 to the N-th determination unit 33-N each acquire a certainty factor for a result of the subject recognition for a corresponding one of the divided images G-1 to G-N (steps S7-1 to S7-N). Then, the first determination unit 33-1 to the N-th determination unit 33-N determine whether or not the certainty factor is greater than or equal to the predetermined threshold (steps S8-1 to S8-N).

In a case where it is determined that the certainty factor is greater than or equal to the predetermined threshold (steps S8-1 to S8-N: Yes), the encoding unit 34 quantizes each of the divided images G-1 to G-N for which it is determined that the certainty factor is greater than or equal to the predetermined threshold, and then executes encoding processing for communication (steps S9-1 to S9-N), and transmits the encoded images to the server device 20 (steps S10-1 to S10-N).

In a case where it is determined that the predetermined subject is not included, or in a case where it is determined that the moving object detection is not made although the predetermined subject is included, that is, the predetermined subject appears but is not moving (steps S5-1 to S5-N: No), or in a case where it is determined that the certainty factor is not greater than or equal to the predetermined threshold (steps S8-1 to S8-N: No), the first determination unit 33-1 to the N-th determination unit 33-N determine that transmission of the divided image is unnecessary (steps 36-1 to S6-N). Then, in a case where it is determined that transmission of all the divided images is unnecessary (step S11: Yes), the determination unit 33 outputs the inference result inferred by the inference unit 32 (step S12). In addition, in a case where it is determined that transmission of all the divided images is not unnecessary (step S11: No), the determination unit 33 ends the processing on the image G to be processed.

Figure 5:
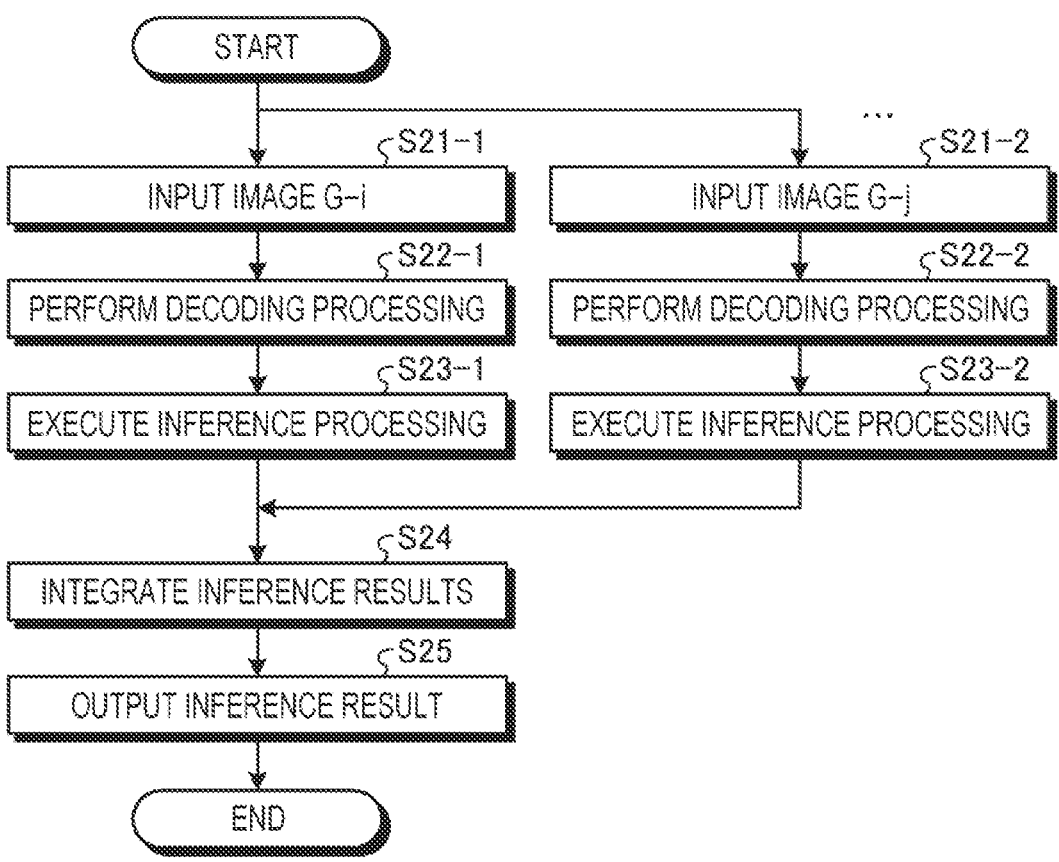
FIG. 5 is a flowchart illustrating a flow of processing executed by a server device illustrated in FIG. 3.

[Processing in Server Device] FIG. 5 is a flowchart illustrating a flow of processing executed by the server device 20 illustrated in FIG. 3. As illustrated in FIG. 5, in the server device 20, when inputs of divided images G-i and G-j transmitted from the edge device 30 are received (steps S21-1, S21-2), the first decoder 21-1 and the second decoder 21-2 perform decoding processing on the divided images G-i and G-j, respectively (steps S22-1, S 22-2).

Then, the inference unit 22 inputs the divided images G-i and G-j output from the edge device 30 to the DNN2-1 to the DNN2-9, and executes the inference processing on the divided images G-i and G-j, respectively (steps S23-1, S23-2).

The integration unit 23 integrates inference results for the divided images G-i and G-j (step S24), and outputs an integrated inference result as a processing result of the image that is processing data (step S25).

[Effects of Embodiment] In the processing system according to the embodiment, in the edge device 30, pieces of processing including the inference processing is executed in parallel for the respective divided images obtained by dividing the processing image, and only the divided image satisfying the predetermined condition is transmitted to the server device 20. Thus, in the present embodiment, the amount of data transfer from the edge device 30 to the server device 20 can be reduced as compared with a case where the entire image to be processed is transmitted to the server device. In addition, the server device 20 performs inference processing only for the transmitted divided image. For this reason, in the processing system according to the embodiment, it is possible to reduce the computation load in the server device 20 as compared with the case of performing the inference processing on the entire image to be processed. In addition, in a widely used model such as YOLO, the maximum resolution of an input image may be determined. In a case where such a model is selected as the DNN1-1 to the DNN1-N to be disposed in the edge device, since divided images obtained by dividing the target image are respectively input to the DNN1-1 to DNN1-N, it is possible to use the model for inference without deteriorating information included in the image by designing a divided size to be less than or equal to the maximum resolution. It goes without saying that the divided size should be a size that satisfies a target depending on the target of recognition of a subject, detection of an event, or the like, for example.

In addition, in the embodiment, the edge device 30 selects, from among the plurality of divided images, a divided image including a predetermined subject and having a certainty factor of subject recognition for the divided image being greater than or equal to a predetermined threshold, and outputs the selected divided image to the server device 20. Alternatively, the edge device 30 selects, from among the plurality of divided images, a divided image that includes a predetermined subject and in which moving object detection is made, the divided image having a certainty factor of the result of the subject recognition for the divided image being greater than or equal to the predetermined threshold, and outputs the selected divided image to the server device 20. Thus, in the embodiment, it is possible to transmit only the divided image considered to require high-accuracy inference processing from the edge device 30 to the server device 20.

In addition, since the server device 20 integrates the inference results for the respective divided images by the inference unit 22 and outputs the integrated inference result as the inference result for one image to be processed, the user can accurately recognize the inference result for the image to be processed.

Note that, in a case where one subject appears in the divided image, the edge device 30 may add a classification result to a bounding box of the subject and transmit the result to the server device 20 in the subsequent stage. Note that the bounding box of the subject is a divided image and intends to an area in which the subject appears. In a case where one subject appears in the divided image, the edge device 30 may cut off a target portion in which the subject appears, add a classification result to a cut partial image, and transmit the partial image to the server device 20 in the subsequent stage.

In addition, in a case where a plurality of various subjects appears in the divided image, the edge device 30 may add the classification result to the bounding box of each subject and transmit all the results to the server device 20 in the subsequent stage. In a case where a plurality of various subjects appears, the edge device 30 may cut off target portions in which respective subjects appear, divide the target portions, and separately transmit the target portions to the server device 20 in the subsequent stage.

In addition, in a case where a plurality of various subjects appears in the divided image, the edge device 30 may add the classification result to the bounding box of the subject belonging to a specific classification and transmit the bounding box to the server device 20 in the subsequent stage. In a case where a plurality of various subjects appears in the divided image, the edge device 30 may cut off target portions in which respective subjects appear, divide the target portions, and separately transmit the target portions to the server device 20 in the subsequent stage. In addition, the edge device 30 may select a divided image in which a subject of a specific classification appears and transmit the divided image to the server device 20 in the subsequent stage. For example, in the case of an image in which a person and a dog appear, the edge device 30 may transmit a divided image in which only the person appears to the server device 20 in the subsequent stage.

Figure 6:
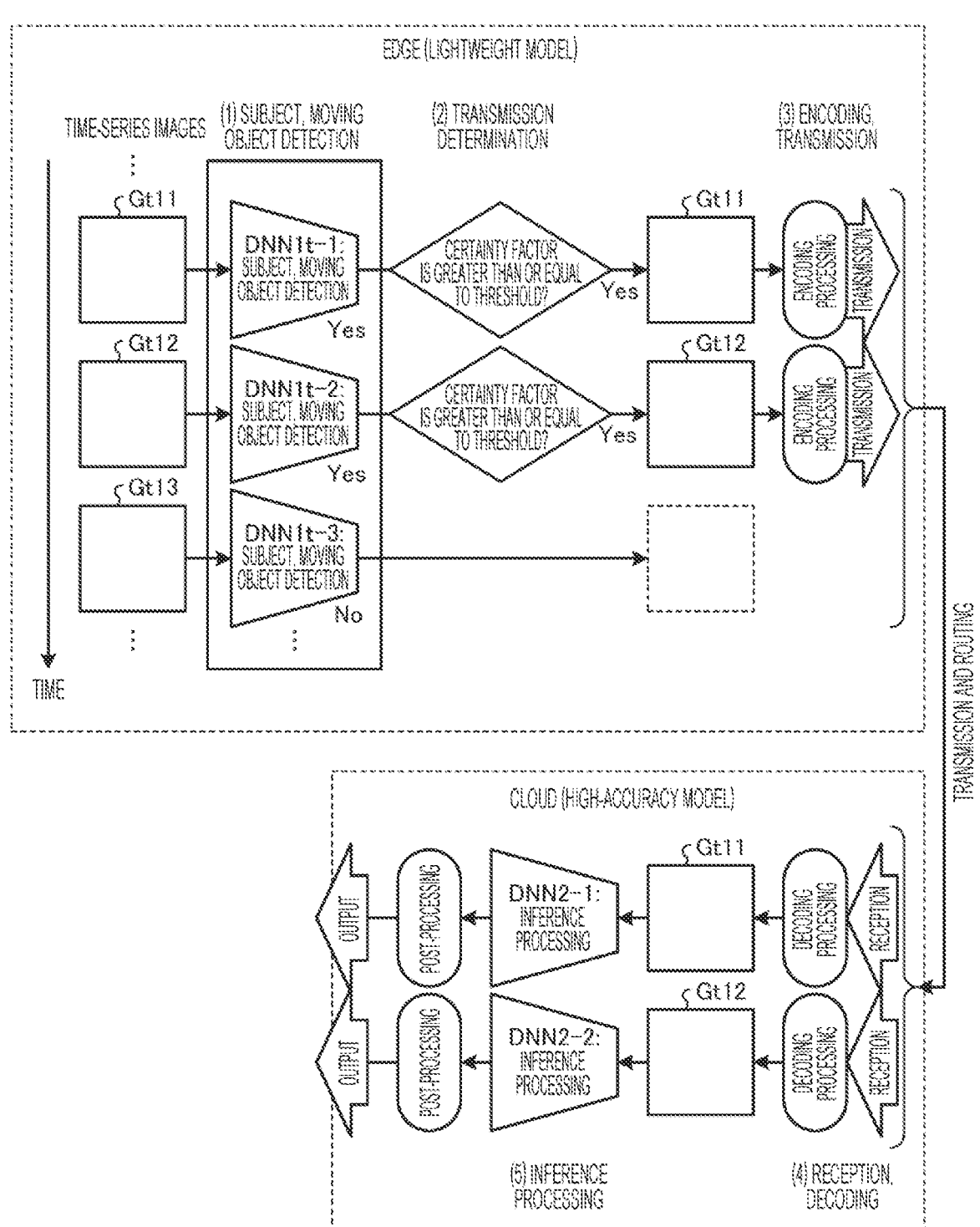
FIG. 6 is a diagram illustrating an outline of a processing method of a processing system according to Modification 1 of the embodiment.

[Modification 1] In the embodiment, the case where the processing data is one image has been described as an example, but the processing data may be a plurality of images (time-series images) captured in time series. FIG. 6 is a diagram illustrating an outline of a processing method of a processing system according to Modification 1 of the embodiment.

As illustrated in FIG. 6, in a case where images Gt11 to Gt13 that are time-series images are input as processing data, the edge device 30 distributes the images Gt11 to Gt13 to a DNN1*t*-1 to a DNN1*t*-3, respectively, and causes the DNN1*t*-1 to the DNN1*t*-3 to execute subject recognition and moving object detection ((1) of FIG. 6). Note that the number of the DNN1*t*-1 to the DNN1*t*-3 is an example, and is set depending on the resources of the edge device 30 and the like. The DNN1*t*-1 to the DNN1*t*-3 may be one common DNN. The DNN1*t*-1 to the DNN1*t*-3 may be the same DNNs as the DNN1-1 to the DNN1-N, or may be different DNNs. In addition, each of the DNN1*t*-1 to the DNN1*t*-3 can omit the moving object detection.

Subsequently, the edge device 30 selects, from among the DNN1*t*-1 to the DNN1*t*-3, the images Gt11 and Gt12 that include a predetermined subject and in which the moving object detection is made. Subsequently, the edge device 30 determines that the images Gt11 and Gt12 of which the certainty factor for the result of the subject recognition for the image is greater than or equal to the predetermined threshold are the transmission targets ((2) of FIG. 6).

Then, the edge device 30 performs encoding processing on the selected images Gt11 and Gt12 for each of the images Gt11 and Gt12, and transmits the encoded images to the cloud (server device 20) ((3) of FIG. 6). Note that, in this Modification 1, the edge device 30 can omit the division unit 31 illustrated in FIG. 3. In addition, in a case where each of the DNN1*t*-1 to the DNN1*t*-3 omits the moving object detection, the edge device 30 only needs to select an image including a predetermined subject and having a certainty factor greater than or equal to the predetermined threshold as a transmission target.

Then, when receiving the images Gt11 and Gt12 output from the edge device 30, the server device 20 on the cloud side decodes each of the images Gt11 and Gt12 ((4) of FIG. 6), and inputs the images to the DNN2-1 to the DNN2-9, respectively. In the server device 20, the DNN2-1 to the DNN2-9 perform inference processing of inferring the probability for each class of the object appearing in the image for the input images Gt11 and Gt12 ((5) of FIG. 6). Then, after performing predetermined post-processing, the server device 20 outputs the inference results of the DNN2-1 to DNN2-9. In this Modification 1, the server device 20 can omit the integration unit 23 illustrated in FIG. 3.

As described above, even if the processing data is a plurality of images captured along a time series, the edge device 30 selects only an image that requires high-accuracy inference processing from the plurality of images and transmits the image to the server device 20, so that effects similar to those of the embodiment are obtained.

[Modification 2] In addition, the processing system may select some images from a plurality of images captured along a time series, and then divide the selected images, select a divided image that requires high-accuracy inference processing, and transmit only the selected divided image to the server device.

Figure 7:
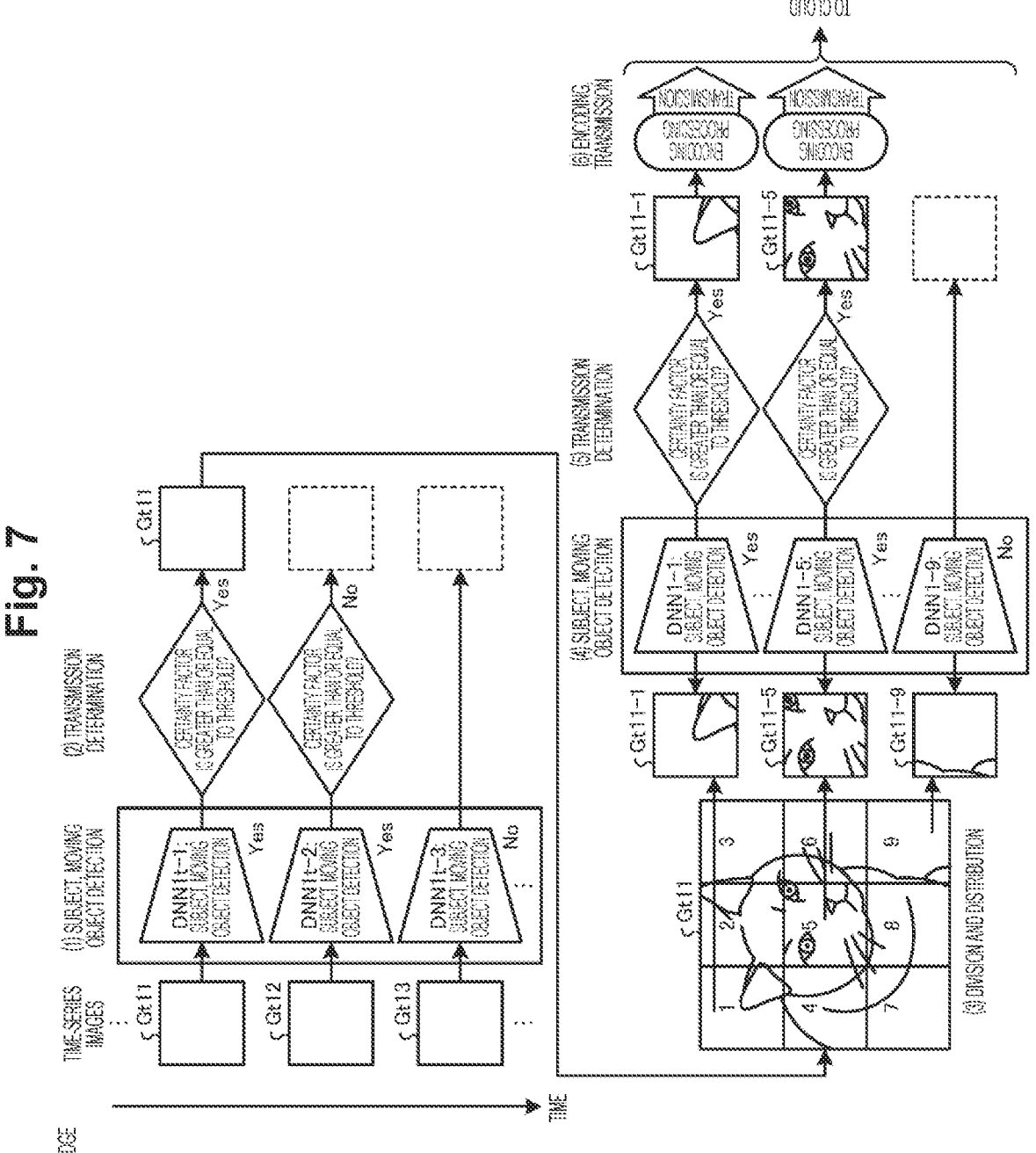
FIG. 7 is a diagram illustrating an outline of a processing method in an edge device of a processing system according to Modification 2 of the embodiment.
Figure 8:
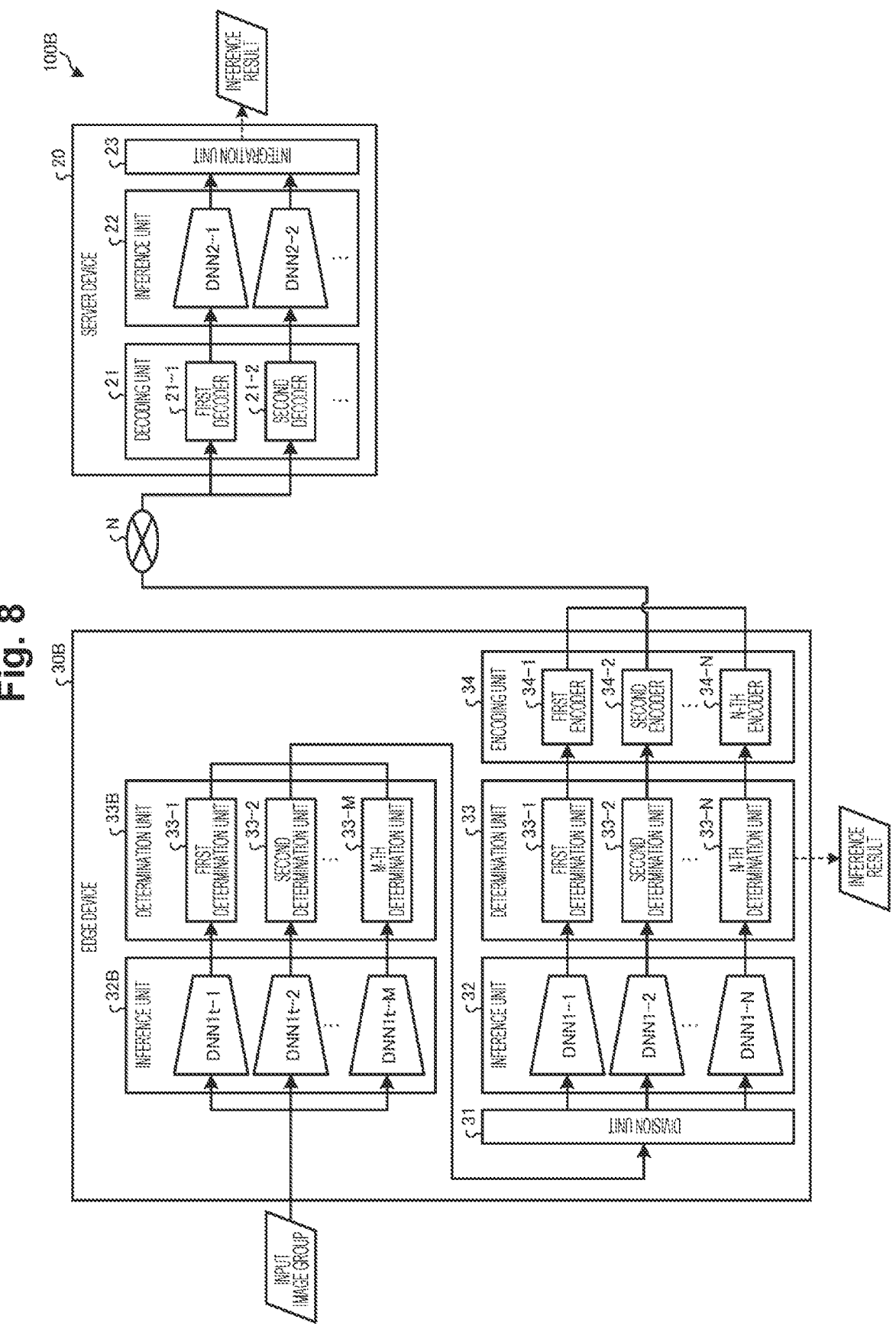
FIG. 8 is a diagram schematically illustrating an example of a configuration of the processing system according to Modification 2 of the embodiment.

FIG. 7 is a diagram illustrating an outline of a processing method in an edge device of a processing system according to Modification 2 of the embodiment. FIG. 8 is a diagram schematically illustrating an example of a configuration of the processing system according to Modification 2 of the embodiment.

As illustrated in FIGS. 7 and 8, in a processing system 100B according to Modification 2 of the embodiment, in a case where an input image group (for example, the images Gt11 to Gt13) that includes time-series images is input to an edge device 30B as processing data, an inference unit 32B respectively distributes the images to the DNN1*t*-1 to the DNN1*t*-M (M is a natural number), and causes the DNN1*t*-1 to the DNN1*t*-M to execute subject recognition and moving object detection ((1) of FIG. 7).

Subsequently, in a determination unit 33B, the first determination unit 33-1 to an M-th determination unit 33-M select images (for example, the images Gt11 and Gt12) that include a predetermined subject and in which the moving object detection is made, on the basis of inference results by the DNN1*t*-1 to DNN1*t*-M. Then, the first determination unit 33-1 to the M-th determination unit 33-M (for example, the first determination unit 33-1 and the second determination unit 33-2) determine whether or not the certainty factors of the images Gt11 and Gt12 are greater than or equal to the predetermined threshold, and select an image to be transmitted (for example, the image Gt11) ((2) of FIG. 7). Note that each of the DNN1*t*-1 to DNN1*t*-M can omit the moving object detection. In a case where each of the DNN1*t*-1 to the DNN1*t*-M omits the moving object detection, the first determination unit 33-1 to the M-th determination unit 33-M each only need to select an image including a predetermined subject and having a certainty factor greater than or equal to the predetermined threshold as a transmission target.

Then, in the edge device, the division unit 31 divides the image Gt11 into, for example, nine equal parts, and distributes divided images Gt11-1 to Gt11-9 to the DNN1-1 to the DNN1-N (for example, the DNN1-1 to the DNN1-9) of the inference unit 32, respectively ((3) of FIG. 7).

Subsequently, the DNN1-1 to the DNN1-N perform subject recognition and moving object detection for inferring a probability for each class of an object appearing in the respective input divided images (for example, the divided images Gt11-1 to Gt11-9) ((4) of FIG. 7).

In the determination unit 33, the first determination unit 33-1 to the N-th determination unit 33-N select divided images (for example, the divided images Gt11-1 and Gt11-5) that include a predetermined subject and in which the moving object detection is made, on the basis of the inference results by the DNN1-1 to the DNN1-N, and acquire certainty factors of the divided images G1-1 and G1-5.

Subsequently, the first determination unit 33-1 to the N-th determination unit 33-N determine that the divided images Gt11-1 and Gt11-5 of which the certainty factors are greater than or equal to the predetermined threshold are transmission targets ((5) of FIG. 7). The encoding unit 34 quantizes the divided images Gt11-1 and Gt11-5, and then performs encoding processing and transmits the encoded images to the cloud (server device 20) ((6) of FIG. 7). Note that each of the DNN1-1 to the DNN1-N can omit the moving object detection. In a case where each of the DNN1-1 to DNN1-N omits the moving object detection, the first determination unit 33-1 to the N-th determination unit 33-N each only need to select a divided image including a predetermined subject and having a certainty factor greater than or equal to the predetermined threshold as a transmission target.

As described above, in Modification 2 of the embodiment, in the edge device 30B, the inference unit 32B inputs a plurality of images imaged along a time series respectively to the DNN1*t*-1 to the DNN1*t*-M to cause the subject recognition to be executed, and the determination unit 33B selects an image recognized in a corresponding one of the DNN1*t*-1 to the DNN1*t*-M that at least a predetermined subject is included, among the plurality of images.

Then, in the edge device 30B, the division unit 31 divides the image selected by the determination unit 33B, and the inference unit 32 inputs a plurality of divided images to the corresponding DNN1*s* among the DNN1-1 to the DNN1-N, and causes the subject recognition in each of the DNN1-1 to the DNN1-N to be executed. Subsequently, in the edge device 30B, the determination unit 33 outputs, to the server device 20, a divided image determined in a corresponding one of the DNN1-1 to the DNN1-N that the divided image includes at least a predetermined subject and has a certainty factor greater than or equal to the predetermined threshold, among the plurality of divided images.

As described above, the edge device 30B may select only an image that requires high-accuracy inference processing from the plurality of images, and then further divide the selected image, select a divided image that requires high-accuracy inference processing, and transmit only the selected divided image to the server device 20, thereby further reducing the amount of data transfer and the computation load in the server device 20.

[Modification 3] A method for further reducing the amount of data transfer and the overall computation load will be described. Hereinafter, it is described that inference is performed by the DNN1, but inference may be performed by any of the DNN1-1 to the DNN1-N. It is assumed that a moving object is detected as a result of inference performed by the DNN1-1 at a certain time point T. In a case where a subject is detected at time points of T-n, . . . , T-1 in an area that is wider than a bounding box corresponding to the moving object and is a part that is not the entire image, it may be inferred that the moving object detected at the certain time T is the subject detected at the time points of T-n, . . . , T-1.

Similar inference may be performed on a divided image transmitted to the DNN2 as a moving object. Furthermore, in a case where the area indicates substantially the same space in the real space, similar inference may be performed on divided images transmitted from the plurality of DNN1-ks ($1 \le k \le N$).

Note that, in the present embodiment, a plurality of the edge devices 30 and 30B or a plurality of the server devices 20 may be provided, and both the plurality of edge devices 30 and 30B and the plurality of server devices 20 may be provided.

In addition, in the present embodiment, an example of processing an image has been described, but the present invention is not limited thereto, and the processing data may be a detection result by a sensor or the like, and the first inference unit 32 and the second inference unit 21 may perform, for example, object detection for detecting the presence or absence of a predetermined object.

[System Configuration etc.] Each component of each device that has been illustrated is functionally conceptual, and is not necessarily physically configured as illustrated. That is, a specific form of distribution and integration of each device is not limited to the illustrated form. All or some of the components may be functionally or physically distributed and integrated in an arbitrary unit according to various loads, usage conditions, and the like. Furthermore, all or any part of each processing function performed in each device can be implemented by a CPU and a program analyzed and executed by the CPU, or can be implemented as hardware by wired logic.

In addition, among pieces of processing described in the present embodiment, all or some of pieces of processing described as being performed automatically can be performed manually, or all or some of pieces of processing described as being performed manually can be performed automatically by a known method. In addition, the processing procedures, the control procedures, the specific names, and the information including various data and parameters illustrated in the specification and the drawings can be arbitrarily changed unless otherwise specified.

Figure 9:
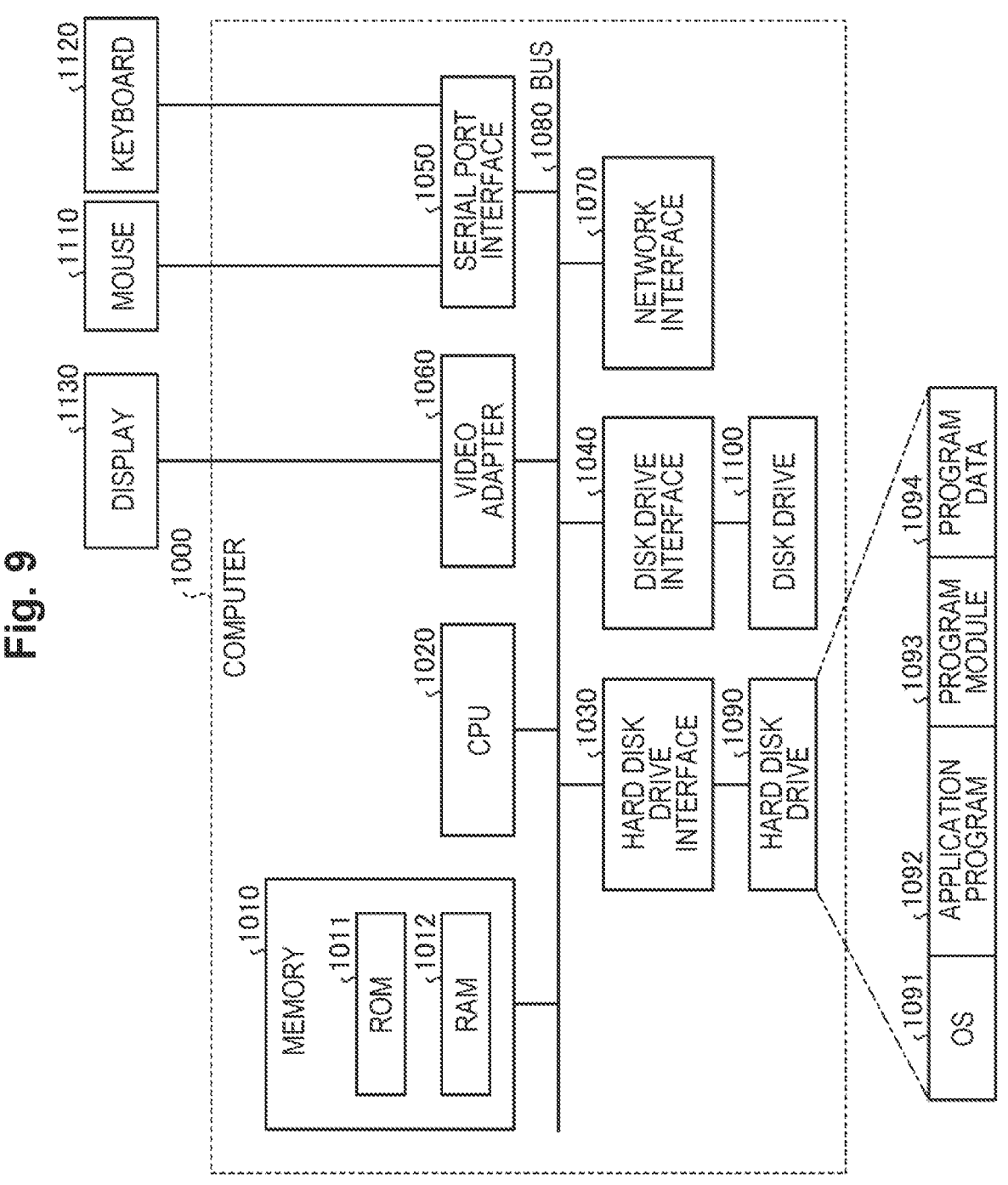
FIG. 9 is a diagram illustrating an example of a computer on which the edge device and the server device are implemented by executing a program.

[Program] FIG. 9 is a diagram illustrating an example of a computer on which the edge devices 30 and 30B and the server device 20 are implemented by executing a program. A computer 1000 includes, for example, a memory 1010 and a CPU 1020. In addition, the accelerators described above may be provided to assist computation. In addition, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program that defines each piece of processing of the edge devices 30 and 30B and the server device 20 is implemented as the program module 1093 in which a code executable by the computer is described. The program module 1093 is stored in, for example, the hard disk drive 1090. For example, the program module 1093 for executing processing similar to functional configurations of the edge devices 30 and 30B and the server device 20 is stored in the hard disk drive 1090. Note that the hard disk drive 1090 may be replaced with a solid state drive (SSD).

In addition, setting data used in the processing of the above-described embodiment is stored, for example, in the memory 1010 or the hard disk drive 1090 as the program data 1094. Then, the CPU 1020 reads and executes the program module 1093 and the program data 1094 stored in the memory 1010 or the hard disk drive 1090 to the RAM 1012, as necessary.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

Although the embodiment to which the invention made by the present inventor is applied has been described above, the present invention is not limited by the description and drawings constituting a part of the disclosure of the present invention according to the present embodiment. In other words, other embodiments, examples, operation techniques, and the like made by those skilled in the art and the like on the basis of the present embodiment are all included in the scope of the present invention.

REFERENCE SIGNS LIST 20 server device
21 decoding unit 22, 32, 32B inference unit
23 integration unit
30 edge device
31 division unit
33, 33B determination unit
34 encoding unit
100, 100B processing system

The invention claimed is:

1. A processing system performed by using an edge device and a server device, wherein
the edge device includes:
first processing circuitry configured to:
input divided data obtained by dividing processing data into a plurality of pieces to a corresponding first model among a plurality of first models, and cause inference in each of the first models to be executed; and
output, to the server device, only the divided data for which it is determined that an inference result in the corresponding first model matches a predetermined condition among a plurality of pieces of the divided data, and
the server device includes
second processing circuitry configured to
execute inference processing on the divided data output from the edge device by using a second model having a higher amount of computation than that of the first model.

2. The processing system according to claim 1, wherein the first processing circuitry is further configured to:
input the divided data divided to the corresponding first model among the plurality of first models, and cause object detection in each of the first models to be executed, and
output, to the server device, the divided data determined in the corresponding first model that at least a predetermined object is included, among the plurality of pieces of the divided data.

3. The processing system according to claim 2, wherein the first processing circuitry is further configured to output, to the server device, the divided data that includes the predetermined object and in which a certainty factor, which is a degree of certainty that a result of the object detection by the first model is correct, is greater than or equal to a predetermined threshold, among the plurality of pieces of the divided data.

4. The processing system according to claim 2, wherein the first processing circuitry is further configured to:
perform object detection and moving object detection on the divided data, and
output, to the server device, the divided data that includes the predetermined object and in which moving object detection is made, among the plurality of pieces of the divided data.

5. The processing system according to claim 2, wherein the second processing circuitry is further configured to integrate inference results for the respective pieces of the divided data and output an integrated inference result as an inference result for the processing data.

6. The processing system according to claim 2, wherein the processing data is one image, and
the first processing circuitry is further configured to:
input each of a plurality of divided images obtained by dividing the one image to a corresponding first model among the plurality of first models, and cause subject recognition in each of the first models to be executed, and output, to the server device, the divided images determined in the respective first models that at least a predetermined subject is included, among the plurality of divided images.

7. The processing system according to claim 2, wherein the processing data is a plurality of images captured along a time series, and
the first processing circuitry is further configured to:
input each of the plurality of images to a corresponding first model among the plurality of first models, and cause subject recognition in each of the first models to be executed, and
output, to the server device, the images determined in the respective first models that at least a predetermined subject is included, among the plurality of images.

8. The processing system according to claim 2, wherein the processing data is a plurality of images captured along a time series, and
the first processing circuitry is further configured to:
input each of the plurality of images to a corresponding first model among the plurality of first models, and cause subject recognition in each of the first models to be executed,
select an image recognized in the corresponding first model that at least a predetermined subject is included, among the plurality of images,
input each of a plurality of divided images obtained by dividing the image selected to a corresponding first model among the plurality of first models, and cause subject recognition in each of the first models to be executed, and
output, to the server device, the divided images determined in the respective first models that at least a predetermined subject is included, among the plurality of divided images.

9. The processing system according to claim 2, wherein the first processing circuitry is further configured to respectively encode the pieces of the divided data determined to be output to the server device and output the encoded pieces of the divided data to the server device, and
the second processing circuitry is further configured to respectively decode the pieces of the divided data encoded.

10. A processing method executed by a processing system performed by using an edge device and a server device,
the processing method comprising:
inputting divided data obtained by dividing processing data into a plurality of pieces to a corresponding first model among a plurality of first models, and causing inference in each of the first models to be executed;
outputting, to the server device, only the divided data for which it is determined that an inference result in the corresponding first model matches a predetermined condition among a plurality of pieces of the divided data; and
executing inference processing on the divided data output from the edge device by using a second model having a higher amount of computation than that of the first model.

11. A non-transitory computer-readable recording medium storing therein a processing program that causes a computer to execute a process comprising:
inputting divided data obtained by dividing processing data into a plurality of pieces to a corresponding first model among a plurality of first models, and causing inference in each of the first models to be executed;

outputting only the divided data for which it is determined that an inference result in the corresponding first model matches a predetermined condition among a plurality of pieces of the divided data; and executing inference processing on the divided data output from the edge device by using a second model having a higher amount of computation than that of the first model.

*   *   *   *   *